United States Patent Office 3,249,737
Patented May 3, 1966

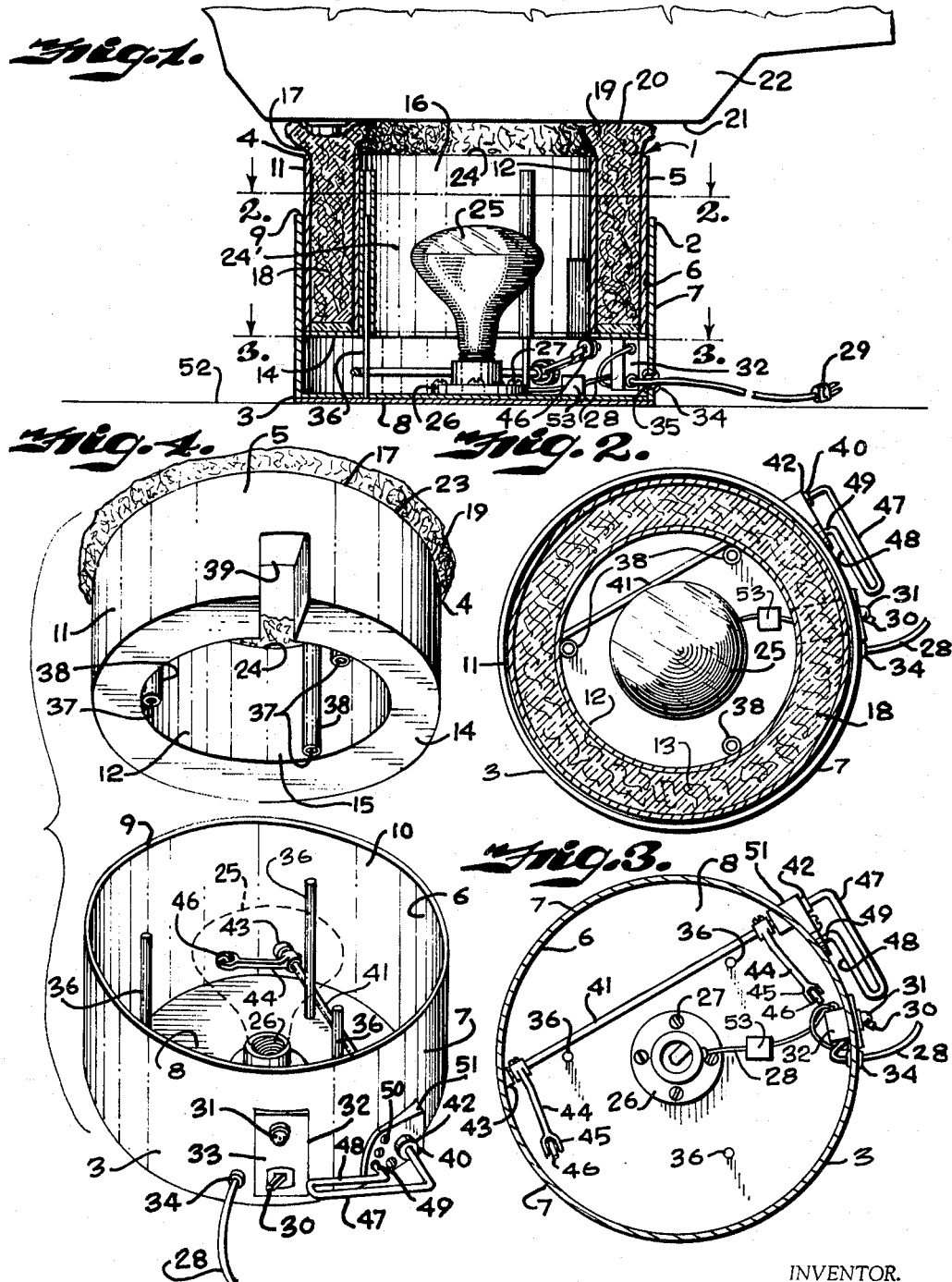

3,249,737
PORTABLE HEATER
John S. Casebeer, Chula, Mo.
Filed Jan. 20, 1964, Ser. No. 338,959
9 Claims. (Cl. 219—205)

This invention relates to portable heaters and the like, and more particularly to portable heaters having electric heating elements arranged to direct or radiate heat therefrom.

This invention contemplates a heater that is easily moved to an area in which heat is desired, particularly in farm areas having a source of electric current, and may be used for heating of small pumphouses, livestock waterers, as well as other places wherein heat or supplemental heat is desired. The invention particularly contemplates a heater for use in applying heat to selected surface areas of objects such as an automobile engine crankcase and provide desired heat to a surface thereof to facilitate starting of the engine in cold weather.

The principal objects of the present invention are to provide a portable electric heater having a housing with an opening therein and a yieldable heat resistant material or insulation surrounding said opening and adapted to engage a surface to be heated with heating means in the housing for directing heat through said opening; to provide such a portable heater wherein the housing is in two sections relatively movable longitudinally of the axis of the opening for elongating said housing whereby it can rest on a surface and the yieldable material engage a surface around an area to be heated; to provide such a heater wherein the two sections are in telescoping relation with one of the sections having a double wall structure forming an annular chamber open at the end with heat insulation material in said chamber and extending from said open end; to provide such a heater wherein there are cooperating movably engaged guide members on the sections to define extension and contracting movement of said sections; to provide such a heater with means on one of the sections engageable with the other to effect extending movement thereof; to provide such a structure with means for retaining the sections in selected extended condition; to provide such a heater wherein the electric heating element is a heating lamp supported on a socket mounted on a bottom wall of a base member with said lamp positioned to direct the heat therefrom through the open end of the housing surrounded by the yieldable heat insulation which when engaged with an object to be heated together with the housing defines a closed heat chamber that reduces or eliminates the hazard of any fire resulting from heating an oily or dirty surface of the object; to provide a portable electric heater that is economical to manufacture, easily moved and positioned for heating an object in a safe manner.

Other objects and advantages of this invention will become apparent from the following description taken in connection with the accompanying drawings wherein are set forth by way of illustration and example certain embodiments of this invention.

FIG. 1 is a fragmentary side elevational view of an automobile engine crankcase with a vertical sectional view through a heater positioned thereunder for applying heat thereto.

FIG. 2 is a horizontal sectional view through the heater taken on the line 2—2, FIG. 1.

FIG. 3 is a horizontal sectional view through the heater taken on the line 3—3, FIG. 1.

FIG. 4 is a disassembled perspective view of the heater sections.

Referring more in detail to the drawings:

The reference numeral 1 generally designates a portable heater having a housing 2 of two sections in telescoping or extendable relation, one of the sections being a base section 3 and the other section an upper section 4. The upper section 4 has an upstanding wall surface 5 that substantially conforms to a wall surface 6 of an upstanding wall 7 of the base section in size and shape whereby said surfaces are closely positioned or slidably engaged for the relative movement of said sections.

In the structure illustrated, the base section consists of a bottom wall 8 with the peripheral wall 7 upstanding therefrom and terminating in an upper edge 9 that defines an open top 10 of the base section. In the illustrated structure, the upstanding wall 7 of the base section is cylindrical and the surface 6 is the inner surface thereof. The upper section 4 is arranged whereby the surface 5 is an outer surface of an outer wall 11 which cooperates with an inner wall 12 spaced therewith to define an annular chamber 13 therebetween. The inner and outer walls are connected at the lower end of said chamber and preferably the bottom of the chamber is closed by a wall 14 having its outer and inner edges connected to the outer and inner walls 11 and 12 respectively of said upper section. The inner wall 12 defines the inner portion of the upper section and is a through passage 15 open at top and bottom, the top opening 16 being a heat opening through which heat is directed as later described.

The chamber 13 is arranged with an open top 17 and a heat insulation material 18 fills said chamber with a resilient or yieldable portion extending from the open end or top 17 of said chamber to form a yieldable projecting ring 19 with an end 20 adapted to engage a surface 21 of a structure to be heated such as a crankcase housing 22 of an automobile engine. It is preferred that the insulation 18 be of a fibrous material such as glass fibers, asbestos fibers or the like, with the portion or ring 19 of the fibers projecting outwardly beyond the top edges 23 and 24 of the walls 11 and 12 being in the nature of 1 inch or the like so as to be relatively dense yet yieldable to conform to the contours of the surface 21 to be heated when moved thereagainst with sufficient pressure to form a seal with said surface 21. When said end portion of the insulation engages such a surface, it and the surface cooperate with the housing whereby the interior thereof forms a closed heat chamber 24' in which is located a heating element 25 directing heat through the opening 16 to the surface 21.

In the structure illustrated, the heat element 25 is in the form of a heat lamp mounted in a support structure or socket member 26 that is secured on the bottom 8 of the base section by suitable fastening devices such as screws 27. The socket member is connected by electrical conductors 28 with a plug member 29 adapted to be connected to a suitable outlet or other source of electric current. Interposed in the conductors 28 is a switch 30 and a pilot light 31 arranged on a switch housing 32 having a plate portion 33 on the outer surface of the wall 7 whereby the switch and the light are exposed to the exterior and accessible for view and actuation. The conductors 28 are preferably insulated wires and they extend through an insulator bushing 34 mounted in an aperture 35 in the wall 7 adjacent the bottom 8 of the base section.

The upper section 4 is movable relative to the base section 3 and said sections have cooperating members forming guides to aid in maintaining relative alignment and eliminating binding between the sections during such movement. In the structure illustrated, there are a plurality of spaced upstanding posts 36 mounted on the bottom 8 that are slidably received in guide channels 37 in tubular members 38 circumferentially spaced around and secured to the inner wall 12 of the upper housing section 4. The switch housing 32 has a portion extending into the interior of the base housing section, and the upper section 4 has a cut-out portion 39 to form a space or recess into which said switch housing extends when the upper section is in lowered position.

The extension and contraction of the heater housing structure is effected by means of an elevator structure 40 which includes cooperating locking members to hold the heater sections in selected extended position. In the structure illustrated, the elevator 40 includes a shaft 41 that extends through a bearing member 42 and has an end portion in a bearing member 43 on the base housing wall 7 oppositely and in axial alignment with the bearing member 42 whereby said shaft is rotatably mounted in said bearings and is spaced laterally from the axial center of said housing, as illustrated in FIG. 3. Arms 44 are fixed to the shaft 41 and extend therefrom terminating in ends 45 mounting rollers 46 that engage the bottom wall 14 of the upper housing section 4. When said upper housing section 4 is in lowered position, the rollers 46 are in a line disposed laterally opposite from the axial center from the axis of the shaft 41 and, when the shaft is rotated to swing the arms 44 upwardly to raise the upper section, the rollers move along the bottom wall 14 whereby their engagement is near the dimetrical line and then moves slightly therebeyond towards the vertical plane passing through the shaft 41 when the upper section is in its uppermost position. In the structure illustrated, the shaft 41 has an arm or handle 47 fixed thereto and extending laterally therefrom outwardly of and adjacent the housing wall 7 to form a lever arm for rotating the shaft 41. The handle or lever arm 47 has a portion 48 resiliently connected thereto and terminating in an end member or projection 49 adapted to engage in a selected recess of a plurality of recesses 50 in the bearing bracket 51 for the bearing 42, said member or portion 48 being biased toward said bracket to maintain engagement of the projection in the selected recesses. The recesses 50 are arranged on an arc radially of the axis of the shaft 41 whereby as the handle lever 47 is swung to raise the upper section to effect the extension of the housing the projection 49 moves to the recesses upwardly on the bracket and may be engaged in one to retain the selected extension of the housing, for example, it would be engaged in a recess that would retain the end portion 20 of the insulating material extending from the upper section in tight engagement with the surface 21 of a crankcase of an automobile engine. In the illustrated structure, a heat responsive switch or thermostat 53 is connected in the electric circuit and is responsive to a predetermined temperature in the housing to interrupt the circuit to the heating element 25. The thermostat is of conventional structure and is employed to control the operating range of the heater, however, in some uses, it may be unnecessary.

In using a structure constructed and assembled as described for heating an automobile crankcase, the lever 47 is grasped and the portion 48 squeezed toward the handle to release the projection 49 from a recess 50, permitting the handle to be moved downwardly to let the upper section 4 lower into the base section. Then, the bottom 8 is placed on a surface 52 under the automobile and moved thereover to position the heater directly under the crankcase. The handle 47 is then grasped, holding the portion 48 to disengage the projection 49 from any recesses and said handle swung upwardly whereby the arms 44 swing and move the rollers 46 in engagement with the wall 14 and move the upper section upwardly in the base section as guided by the posts 36 and guide channels 37. When the projecting portion 20 of the insulating material tightly engages the surface 21 of the crankcase, the portion 48 of the handle is released whereby the projection 49 will engage in an adjacent recess 50, retaining the housing in extended condition whereby the heat chamber 24 is a closed chamber. The conductors 28 are then connected to a suitable source of current and the switch 30 manipulated to effect energization of the heat element 25 which, when energized, directs the heat upwardly through an open end 16 of the housing against the surface 21 within the area engaged by the insulation portion 20. Even though the surface of the crankcase may be dirty, may have oil or other material thereon, the closed heat chamber 24 is such that there is practically no likelihood of fire. By the use of a suitable heat element, the heater can be left in position without hazard, as for example throughout the night, and then when it is desired to start the automobile the switch 30 is manipulated to interrupt the circuit to the heat element, the handle 47 grasped releasing the projection 49 from the recess 50 whereby the upper section 4 is permitted to lower into the base section 3. The heater is then removed from under the automobile and the automobile started. While the heater as constructed and described is particularly adaptable for heating of automobiles and the like, it can also be used for heating other surfaces and, if desired, can merely heat surrounding area by leaving the open end of the housing uncovered while the heating element is energized.

It is to be understood that while I have illustrated and described one form of my invention, it is not to be limited to the specific form or arrangment of parts herein described and shown except insofar as such limitations are included in the claims.

What I claim and desire to secure by Letters Patent is:

1. A portable electric heater comprising, a housing of two sections in telescoping relation, one of said sections being a base section and having a bottom wall and a peripheral wall upstanding therefrom and defining an open top, the other section being an upper section and having an upright wall defining an open top with an outer surface substantially conforming in size and shape to an inner surface of the peripheral wall of the base section for relative vertical movement to elongate the housing, fibrous heat insulation lining said wall of the upper section with a portion of said insulation extending upwardly therefrom and forming a yieldable extension to said upper section wall and around the top thereof for engaging and conforming to surface contour of an object to be heated, said extension and upper section and base section with said object surface defining a closed heat chamber, means movably mounted on one section and having portions engaging the other section in laterally spaced relation, means connected with said movably mounted means for moving same whereby said other section engaging portions raise the upper section and elongate the housing into engagement with an object to be heated, said movably mounted means having portions engaging said one section for retaining said sections in extended position to engage an object to be heated, and an electric heating element in said housing supported on the bottom wall of said base section for directing heat through the open top of the housing.

2. A portable electric heater comprising, an open top housing having two sections in telescoping relation, one of said sections being a base section having a bottom wall and an upstanding peripheral wall forming an open top cup-shaped member, the other section having inner and outer upright walls having substantially equal spacing therearound and of equal height, an upper section bottom wall having inner and outer edges connected to the inner and outer upright walls to close the bottom therebetween and cooperate therewith to form an annular chamber, fibrous heat insulation filling the annular chamber, a resilient heat resistant material projecting upwardly from the top of said upper section to form a yieldable extension for conforming to the contour of engaged portions of a surface to be heated, a plurality of upstanding guide posts on said base section, a plurality of guide channels on the upper section for receiving corresponding guide posts to define a path of telescoping movement of said sections, an electric heat element supported in said base section and arranged to direct heat through said open top of the upper section when energized, electric conductors connected with said heat element and including a switch for controlling energization of said heat element, means movably mounted on said base section and having engagement with said upper section for effecting movement of one section relative to the other, and cooperating means on said base section and said section moving means for retaining the sections in selected extended position.

3. A portable electric heater comprising, an open top housing having two sections in telescoping relation, one of said sections being a base section having a bottom wall and an upstanding peripheral wall forming an open top cup-shaped member, the other section having inner and outer upright walls having substantially equal spacing therearound and of equal height, an upper section bottom wall having inner and outer edges connected to the inner and outer upright walls to close the bottom therebetween and cooperate therewith to form an open top annular chamber, fibrous heat insulation filling the annular chamber and having a resilient portion projecting upwardly from the open top thereof to form a yieldable extension of heat resistant material for conforming to the contour of engaged portions of a surface to be heated, one of said upright walls of said upper section substantially conforming to the size and shape of the upright peripheral wall of said base section and movably engaged therewith, a plurality of upstanding guide posts on said base section, a plurality of guide channels on the upper section for receiving corresponding guide posts to define a path of telescoping movement of said sections, an electric heat element supported in said base section and arranged to direct heat through said open top of the upper section when energized, electric conductors connected with said heat element and including a switch for controlling energization of said heat element, means movably mounted on said base section and having engagement with said upper section for effecting movement of one section relative to the other, and cooperating means on said base section and said section moving means for retaining the sections in selected extended position.

4. A portable electric heater as set forth in claim 3 wherein the means for moving said one section relative to the other includes a shaft rotatably mounted in the base section adjacent the bottom thereof with arms extending from said shaft and having portions engaging the upper section in laterally spaced relation to said shaft, and means for rotating said shaft whereby the arms raise the upper section relative to the base section for elongating the housing and moving the extending portion of the insulation into engagement with a surface to be heated.

5. A portable electric heater as set forth in claim 4 wherein the means for rotating the shaft is a laterally extending handle exteriorly of the base section and the means retaining the sections in extended position are a plurality of spaced recesses opening exteriorly of the base section and a projection resiliently mounted on said handle and biased into engagement with a selected recess.

6. A portable electric heater comprising, a housing of two sections in telescoping relation, one of said sections being a base section and having a bottom wall and a peripheral wall upstanding therefrom and defining an open top, the other section being an upper section and having an upright wall defining an open top and with a surface substantially conforming in size and shape to an adjacent surface of the peripheral wall of the base section for relative vertical movement to elongate the housing, a yieldable extension of heat resistant material on said upper section wall around the open top thereof for engaging and conforming to surface contour of an object to be heated, said extension cooperating with said upper section, base section and said object surface to define a closed heat chamber, a heating means in said housing supported on the bottom wall of said base section for directing heat through the open top of the housing, a shaft rotatably mounted in the base section adjacent the bottom thereof, means on said shaft having portions engaging the upper section in laterally spaced relation to said shaft, an arm on said shaft and extending laterally thereof exteriorly of the base section and operative to rotate said shaft, said base section having a plurality of spaced recesses opening exteriorly thereof, and a projection carried by said arm and movable into engagement with a selected recess for retaining the sections in extending position to engage an object to be heated.

7. A portable electric heater comprising, a housing of two sections in telescoping relation, one of said sections being a base section and having a bottom wall and a peripheral wall upstanding therefrom and defining an open top, the other section being an upper section and having inner and outer upright walls connected at bottom edges and defining an open top annular chamber therebetween, one of said walls of the upper section having a surface substantially conforming in size and shape to an adjacent surface of the peripheral wall of the base section for relative vertical movement to elongate the housing, fibrous heat insulation filling the annular chamber with a portion of said insulation extending from said chamber and forming a yieldable extension to said upper section for engaging and conforming to surface contour of an object to be heated, said extension and upper section and base section with said object surface defining a closed heat chamber, means on one section engaging the other section for retaining said sections in extended position to engage an object to be heated, an electric heating element in said housing supported on the bottom wall of said base section for directing heat through the open top of the housing, a shaft rotatably mounted in the base section adjacent the bottom thereof, arms extending from said shaft and having portions engaging the upper section in laterally spaced relation to said shaft, and means for rotating said shaft whereby the arms raise the upper section relative to the base section for elongating the housing and moving the extending portion of the insulation into engagement with a surface to be heated.

8. A portable electric heater as set forth in claim 7 wherein the shaft has a laterally extending handle exteriorly of the base section for rotating said shaft to effect up and down movement of the upper section and the means retaining the sections in extended position are a plurality of spaced recesses opening exteriorly of the base section and a projection resiliently mounted on said handle and biased into engagement with a selected recess.

9. A portable electric heater as set forth in claim 8 wherein the electric heating element is a lamp bulb in a socket member secured to the bottom wall of the base section whereby the lamp directs heat through the open top of the upper section and an electric circuit connected to the lamp bulb socket includes a switch and a pilot light exteriorly of the base section, said pilot light being energized only when the switch is in circuit-making position.

References Cited by the Examiner

UNITED STATES PATENTS

| 1,723,331 | 8/1929 | Cutler | 219—205 |
| 1,932,703 | 10/1933 | Mancuso | 219—346 |
| 2,614,202 | 10/1952 | Jordan | 219—358 X |
| 2,694,135 | 11/1954 | Brockmole | 219—358 X |

RICHARD M. WOOD, *Primary Examiner.*

C. L. ALBRITTON, *Assistant Examiner.*